(12) United States Patent
Corbett et al.

(10) Patent No.: US 6,351,642 B1
(45) Date of Patent: Feb. 26, 2002

(54) CDMA SOFT HAND-OFF

(75) Inventors: Eddie Corbett; Billy Hogan, both of Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/218,168

(22) Filed: Dec. 22, 1998

(51) Int. Cl.$^7$ .................................................. H04Q 7/20
(52) U.S. Cl. ........................ 455/442; 455/440; 455/441
(58) Field of Search ................................ 455/442, 67.1, 455/441, 443, 456, 439, 440

(56) References Cited

U.S. PATENT DOCUMENTS

| | | |
|---|---|---|
| 5,175,867 A | 12/1992 | Wejke et al. |
| 5,235,633 A | 8/1993 | Dennison et al. |
| 5,353,332 A | 10/1994 | Raith et al. |
| 5,432,842 A | 7/1995 | Kinoshita et al. ............. 379/60 |
| 5,530,912 A | 6/1996 | Agrawal et al. |
| 5,551,058 A | 8/1996 | Hutcheson et al. |
| 5,561,839 A | 10/1996 | Österberg et al. |
| 5,572,221 A | 11/1996 | Marlevi et al. ............. 342/452 |
| 5,640,676 A | 6/1997 | Garncarz et al. |
| 5,745,523 A | 4/1998 | Dent et al. |
| 5,884,147 A * | 3/1999 | Reudink et al. ........... 455/67.1 |
| 5,946,621 A * | 8/1999 | Chheda et al. .............. 455/440 |
| 5,987,326 A * | 11/1999 | Tiedemann, Jr. et al. ... 455/442 |
| 6,035,209 A * | 3/2000 | Tiedemann, Jr. et al. ... 455/522 |
| 6,061,565 A * | 5/2000 | Innes et al. .................. 455/436 |
| 6,072,778 A * | 6/2000 | Labedz et al. .............. 370/252 |
| 6,119,018 A * | 9/2000 | Kondo ........................ 455/522 |

FOREIGN PATENT DOCUMENTS

| | | |
|---|---|---|
| EP | 0 602 340 A1 | 6/1994 |
| EP | 0 800 319 A1 | 10/1997 |
| WO | WO 96/16524 | 5/1996 |
| WO | WO 98/19492 | 5/1998 |
| WO | WO 98 30043 A | 7/1998 |

OTHER PUBLICATIONS

Eurpean Search Report completed Jun. 21, 1999.
TEMS–A System for Testing and Monitoring Air Interfaces; *Ericsson Review* No. 1, pp. 34–44, Rikard Lundqvist, 1996.

* cited by examiner

*Primary Examiner*—Thanh Cong Le
*Assistant Examiner*—Thuan T. Nguyen
(74) *Attorney, Agent, or Firm*—Burns, Doane, Swecker & Mathis, L.L.P.

(57) ABSTRACT

A system and method for improving soft hand-off in a CDMA system uses mobile station location and velocity information to maintain soft hand-off legs with those cells in which the mobile station is more likely to be located. The system and method of the present invention estimates the weighted probability of the mobile station arriving in neighboring cells and produces "bias" values for those cells that the mobile station is more likely to be entering or to be located in. These bias values are used for modifying signal quality values for those cells, and for determining whether the current cell or neighbor cells are to be placed in an active set so as to establish, or maintain, soft hand-off legs. The system and method of the present invention thus chooses those cells which are more likely to be retained as soft hand-off legs and therefore reduces the overall number of soft hand-offs.

26 Claims, 6 Drawing Sheets

CDMA SOFT HAND-OFF

BACKGROUND

The present invention is directed generally to radiocommunication systems and, more particularly, to techniques for improving soft hand-off in a CDMA radiocommunication system.

Cellular communication systems conventionally consist of a plurality of base stations arranged in a pattern so as to define a plurality of overlapping cells which provide radiocommunication support in a geographic area. A remote transmitter/receiver unit communicates with the base station of the corresponding cell in which the remote unit resides. This communication typically occurs through a channel assigned to the connection by the system. When the remote unit is mobile, or when the base station is non-stationary (i.e., an orbiting satellite), the remote unit may transition between adjacent cells due to the relative movement between the remote unit and the base station. Absent some intervention by the system, this transitioning would eventually terminate the connection because the received signal strength associated with the signals would diminish to a level where either the base station or remote station cannot adequately receive the other's transmissions to decode information associated therewith. Transitioning between cells can additionally cause a significant degradation in signal quality. This signal quality degradation is typically measured at the mobile station by a quality measure such as bit error rate (BER). Signal quality degradation and termination of communication due to inadequate signal strength represent aspects of the cell transition problem in mobile cellular communications.

A solution to these aspects of the cell transition problem is commonly called "handover. " This conventional technique "hands off" an in-process communication with a remote unit from one base station in a first cell to another base station in another cell. This hand-off process maintains the continuity of the connection and prevents the termination of the call when the mobile station is moving from one cell to another. The hand-off process may be accomplished using a number of system dependent methods.

In a CDMA system, a mobile station may maintain a connection with more than one base station at a time in a process known as soft hand-off. In soft hand-off, the mobile station maintains simultaneous connection with more than one base station so as to induce a diversity effect that improves the quality of the connection. This diversity effect is achieved through communication with different base stations over different air-interface paths that have different fading properties. The combination of signals over the different air-interface paths can improve the quality of the connection and can reduce transmission power requirements between the base and mobile station.

Soft hand-off in a CDMA system such as, for example IS-95, conventionally involves measurements of known pilot signals transmitted from each base station in the system. A mobile station measures the signal quality of each received pilot signal to determine which base station is suitable to serve that mobile. When the mobile station selects a base station that is associated with a preferred signal quality measurement, the mobile station demodulates the transmitted paging channel from that base station and then receives system parameter information from the base station.

The system parameter information received from the base station includes a list of neighbor cells that is transmitted from the base station to the mobile station on the paging channel in different messages such as the neighbor list message, the extended neighbor list message, or the general neighbor list message. Upon receipt of any of these messages, the mobile station stores the list of neighbor cells as its neighbor set. The mobile station then measures the received signal quality of the pilot signal from each base station in the neighbor set. Those base stations with pilot signals that have signal qualities above certain thresholds are then stored in a candidate set. Pilot signals from base stations in the candidate set are then measured by the mobile station more frequently than the base stations in the neighbor set. During an actual call from the mobile station, the individual or plurality of base stations in the candidate set that has the best signal quality are stored in an active set. The base stations currently designated in the active set become the soft hand-off legs for the communication. When the signal quality from the base stations in the legs of the soft hand-off drop below a certain threshold for a given time period, they are dropped from the active set. Furthermore, base stations in the candidate set are added to the active set when their associated pilot signal quality reaches a certain threshold. A user path is then set up to the base station newly added to the active set. This soft hand-off process occurs continuously while a mobile station is on a call. A serving base station may subsequently revise the neighbor list for the mobile station operating on the traffic channel by sending a neighbor list update message or an extended neighbor list update message.

The conventional soft hand-off technique described above is deficient, however, because, for moving mobile stations, some cells are more suitable hand-off leg candidates than others. If a mobile station is moving away from one or more base stations, the signal quality from these base stations may still be sufficient to cause them to be added to the active set. Thus a hand-off leg, in this instance, will be set-up only to be released again in a short time as the mobile station moves away from the base station. Therefore, every time a hand-off leg is added or removed, extra signaling is required which causes unnecessary signaling overhead in the system. Additionally, removal or addition of a hand-off leg requires the burdensome allocation and release of system resources.

Accordingly, it would be desirable to provide a technique for soft hand-off that selects cells for the active set in which the mobile station is likely to stay in longer so as to reduce signaling overhead in the system and to reduce the burden on system resources.

SUMMARY

These desirable characteristics and others are provided by the following exemplary embodiments of the invention.

According to a first exemplary embodiment of the invention a method for performing soft hand-off of a mobile station in a radio communications system is provided. The method of this exemplary embodiment comprises the steps of: determining at least one parameter associated with a velocity of said mobile station; estimating bias values on a chosen set of cells/sectors based on said at least one parameter; determining signal quality values associated with each of said cells/sectors; modifying said signal quality values with said bias values; constructing a list of potential cells/sectors for communication based on said modified signal quality values; and dedicating communication channels between said mobile station and cell/sectors contained in said list.

According to a second exemplary embodiment of the invention a method for in constructing a list of potential cells/sectors for soft hand-off of a mobile station in a radio communications system is provided. The method of this exemplary embodiment, comprises the steps of: determining signal quality values associated with cells/sectors located in proximity to said mobile station; modifying said signal quality values with bias values that are based on at least one parameter associated with said mobile station; and constructing said list based on said modified signal quality values.

According to a third exemplary embodiment of the invention a system for performing soft hand-off of a mobile station in a radio communications system is provided. The system of this exemplary embodiment comprises: means for determining at least one parameter associated with a velocity of said mobile station; means for estimating bias values on a chosen set of cells/sectors based on said at least one parameter; means for determining signal quality values associated with each of said cells/sectors; means for modifying said signal quality values with said bias values; means for constructing a list of potential cells/sectors for communication based on said modified signal quality values; and means for dedicating communication channels between said mobile station and cell/sectors contained in said list.

According to a fourth exemplary embodiment of the invention a system for constructing a list of potential cells/sectors for soft hand-off of a mobile station in a radio communications system is provided. The system of this exemplary embodiment comprises: means for determining signal quality values associated with cells/sectors located in proximity to said mobile station; means for modifying said signal quality values with bias values that are based on at least one parameter associated with said mobile station; and means for constructing said list based on said modified signal quality values.

BRIEF DESCRIPTION OF THE DRAWINGS

The objects and advantages of the invention will be understood by reading the following detailed description in conjunction with the drawings in which.

DETAILED DESCRIPTION

To provide some context within which to describe the present invention consider

Figure 1:
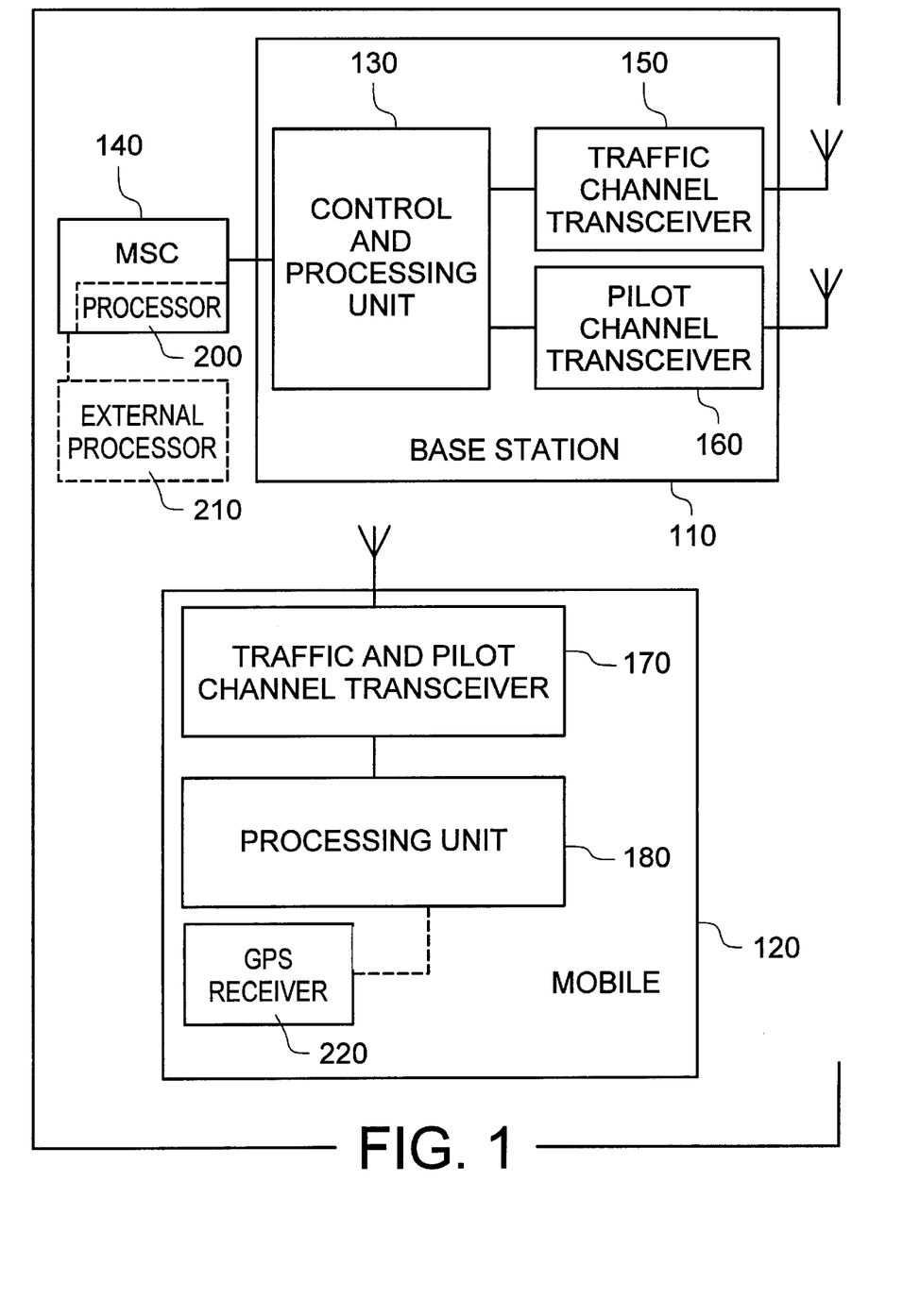
FIG. 1 represents an exemplary implementation of an apparatus for a cellular communications system according to the present invention.

FIG. 1, which represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of the cellular radiotelephone system shown in FIG. 1 are known in the art.

The base station 110 handles a plurality of traffic channels through a traffic channel transceiver 150, which is controlled by the control and processing unit 130. Also, each base station includes a pilot channel transceiver 160 for broadcasting pilot signals to mobile stations 120 in the network. The base station can send pilot signals on one separate frequency or in one time slot of a frequency. Thus, transceivers 150 and 160 could either be separate modules (as shown in FIG. 1) or integrated together as a single dual function module.

The mobile station 120 scans for pilot channels from one or more base stations using its traffic and pilot channel transceiver 170. Then, the processing unit 180 evaluates the quality of the received pilot signals to determine which base stations are suitable candidates to serve the mobile station 120. Similar to the base station traffic and pilot channel transceivers described above, the traffic and pilot channel transceiver 170 can either be integrated together (as shown) or be separated in different modules (similar to 150 and 160 in the base station).

In accordance with an exemplary embodiment of the invention, shown in FIG. 1, mobile station position update information can be provided by the base station control and processing unit 130. This position update information can be calculated in any desired manner. For example, the position can be derived from a GPS receiver 220 located in the mobile station receiver 120. One skilled in the art will recognize, however, that various techniques for determining the location of a mobile station are known in the art. If GPS is used to report the mobile station location, the mobile station can transmit position update information ("mobile position report") to the base station 110 in a regular periodic message that is either periodically transmitted or transmitted based on a positioning request from the network. In other positioning methods, however, the actual positioning determination is performed by the network and thus no position data needs to be transmitted over the air interface. The received GPS position update information can then be transferred from the base station 110 to a switch 140 and then to a processor 200, 210. The processor can be the switch processor 200 of the mobile switching center 140 or, alternatively, can be an additional processor 210 external to the mobile switching center 140. Since the monitoring of the location of every mobile in a cell may strain the capacity of the switch processor, use of an external processor can advantageously permit the transfer of a significant amount of processing load from the switch processor to the external processor.

Figure 2:
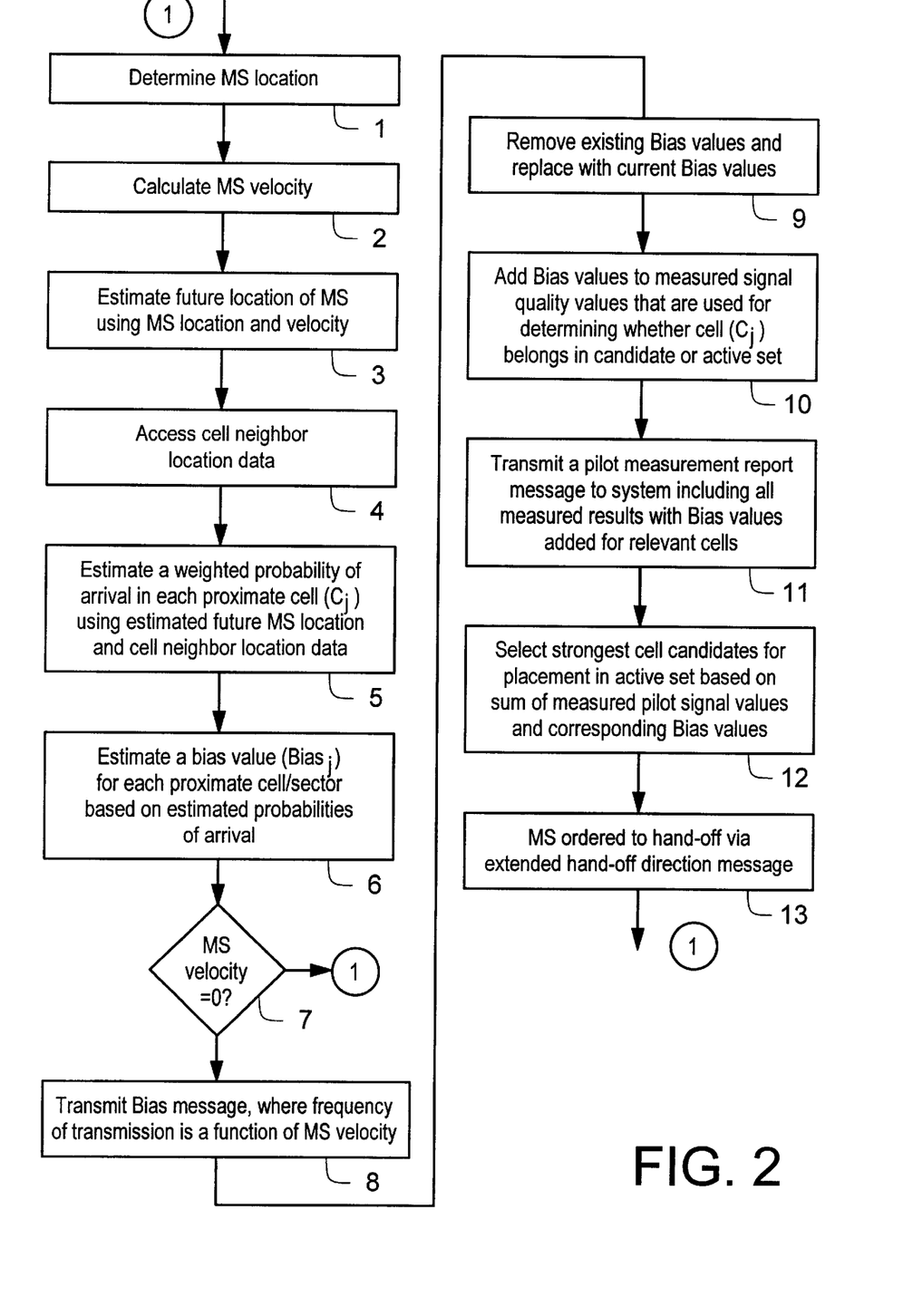
FIG. 2 is a flow diagram of an exemplary embodiment of the invention where the system keeps track of mobile station location and velocity.

As shown in FIG. 2, the exemplary embodiments of the present invention use the position update information described above for modifying the measured quality of the received pilot signals used in an algorithm for performing soft hand-off that increases the likelihood of the mobile station maintaining soft hand-off legs with those cells in which the mobile station is likely to spend a longer period in. A method of an exemplary embodiment is shown beginning at step 1 where the mobile station location is determined by the mobile station itself, or by the system, in a manner discussed above. The system then calculates 2 the mobile station velocity (velocity being a vector quantity including both speed and direction of the mobile station) based on a current location and one or more previous mobile station locations and the time (Δt) elapsed between the location measurements. Using the measured mobile station location and the calculated mobile station velocity the location of the mobile station at some future time is estimated 3. In its simplest form, this estimation can use conventional kinematics well known to one skilled in the art. In a more complex form, the system can take into account known terrain features (e.g., hills, gradients, traffic information from an external news source, urban street configuration) to determine the estimated future location.

After estimating the future location of the mobile station, the system then accesses 4 stored location data of cells proximate to the mobile station. Based on this accessed location data and the estimated future location of the mobile station, a weighted probability of arrival in each proximate cell/sector ($C_j$) can be determined 5. A bias value ($BIAS_{TCj}$) for each neighboring cell/sector can then be estimated 6 based on the determined weighted probabilities of arrival. Thus, a high estimated probability of arrival in a neighboring cell/sector will result in a large bias value associated with that cell/sector. A low estimated probability of arrival in a neighboring cell/sector will result in a small, or even negative, bias value associated with that cell/sector.

Figure 5:
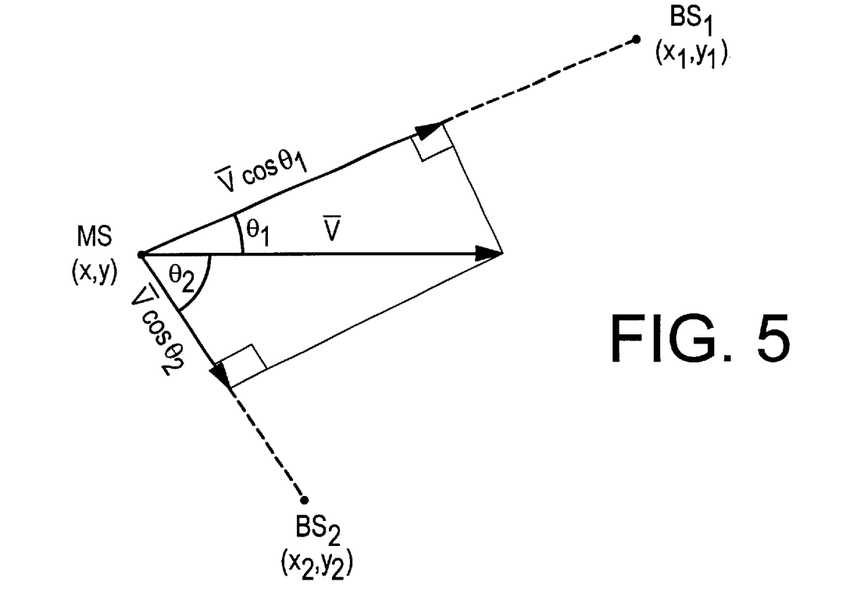
FIG. 5 is a diagram of a velocity vector of a mobile station and components of the velocity vector in the direction of neighboring base stations.

FIG. 5 illustrates an exemplary application of the method steps described above. In FIG. 5, the current location of the mobile station is shown by points (x,y) on a plane. Each base station ($BS_1 \ldots BS_n$) in proximity to the mobile station further has a location $\{(x_1, y_1) \ldots (x_n, y_n)\}$. Given two consecutive mobile station location measurements, performed as described above, the velocity ($\overline{V}$) of the mobile station can thus be calculated. With the mobile station velocity ($\overline{V}$) calculated, the component of the velocity vector ($V \cos \theta_1, \ldots, V \cos \theta_n$) of the mobile station towards each base station ($BS_1, \ldots, BS$.) in a chosen set of base stations in proximity to the mobile station can further be calculated. For example, as shown in FIG. 5, the mobile station velocity component towards $BS_1$ is equal to $V \cos \theta_1$ and the component towards $BS_2$ is equal to $V \cos \theta_2$. The velocity components of V in the direction of each base station can then be used for estimating the future location of the mobile station and the weighted probability of the mobile station arriving in each proximate cell based on, for example, conventional kinematics well known to one skilled in the art. An estimation of the bias values for each base station in proximity to the mobile station can also then be estimated based on the calculated velocity component vectors and the probability of arrival in each proximate cell such that, for example, the bias values would satisfy the relation $BIAS_{BSn}$ $V \cos \theta_n$. As applied to FIG. 5, this would mean that a higher bias value would be associated with $BS_1$, for example.

Figure 6:
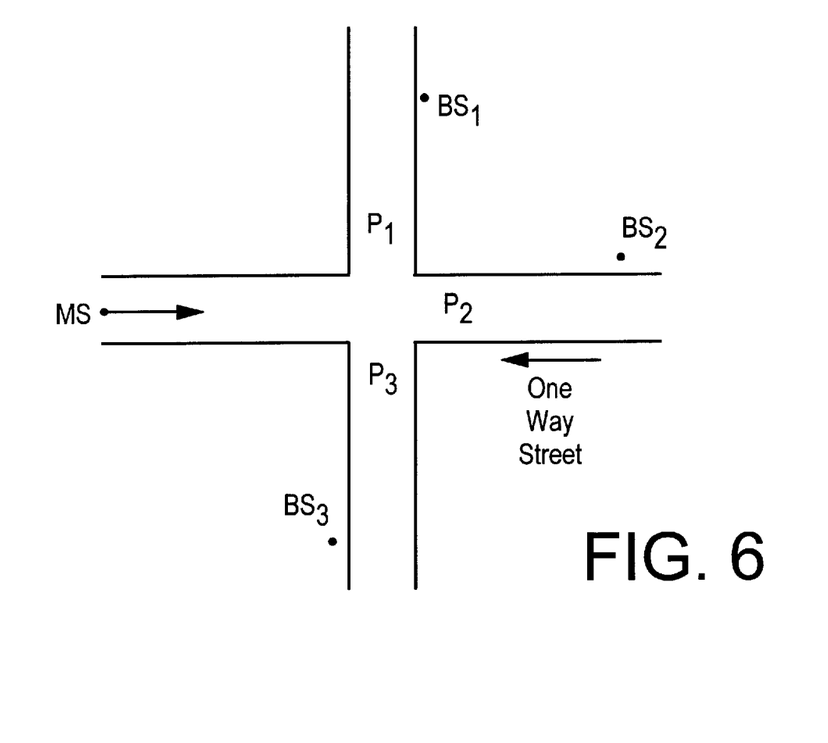
FIG. 6 is a diagram of application of the exemplary embodiments of the invention to an urban street configuration.

FIG. 6 further illustrates application of the exemplary method steps described above to the situation where the mobile station is traveling in an urban environment. In this exemplary application, knowledge of the probability of the mobile station taking a certain route is used to further influence the bias values. As shown in the Figure, the probability of the mobile station turning left is equal to $P_1$, the probability of the mobile station turning right is $P_2$ and the probability of the mobile station driving straight ahead is equal to $P_2$ (where $P_1 + P_2 + P_3 < 1$). For example, as shown in FIG. 6, the mobile station cannot drive straight ahead since the street turns into a one-way street at the intersection. Therefore $P_2$ would equal to 0 and $BS_2$ would receive a negative bias value. Additionally, a knowlegebase could be constructed that would permit the system to "learn" the mobile station's traveling behavior. This would be particularly useful in circumstances where the mobile user regularly takes the same route to or from a specific location (e.g., user driving to workplace). A knowledgebase of a specific mobile station's past movements could thus permit the future location of the mobile station to be easily predicted based on the mobile station's current location.

Figure 3:
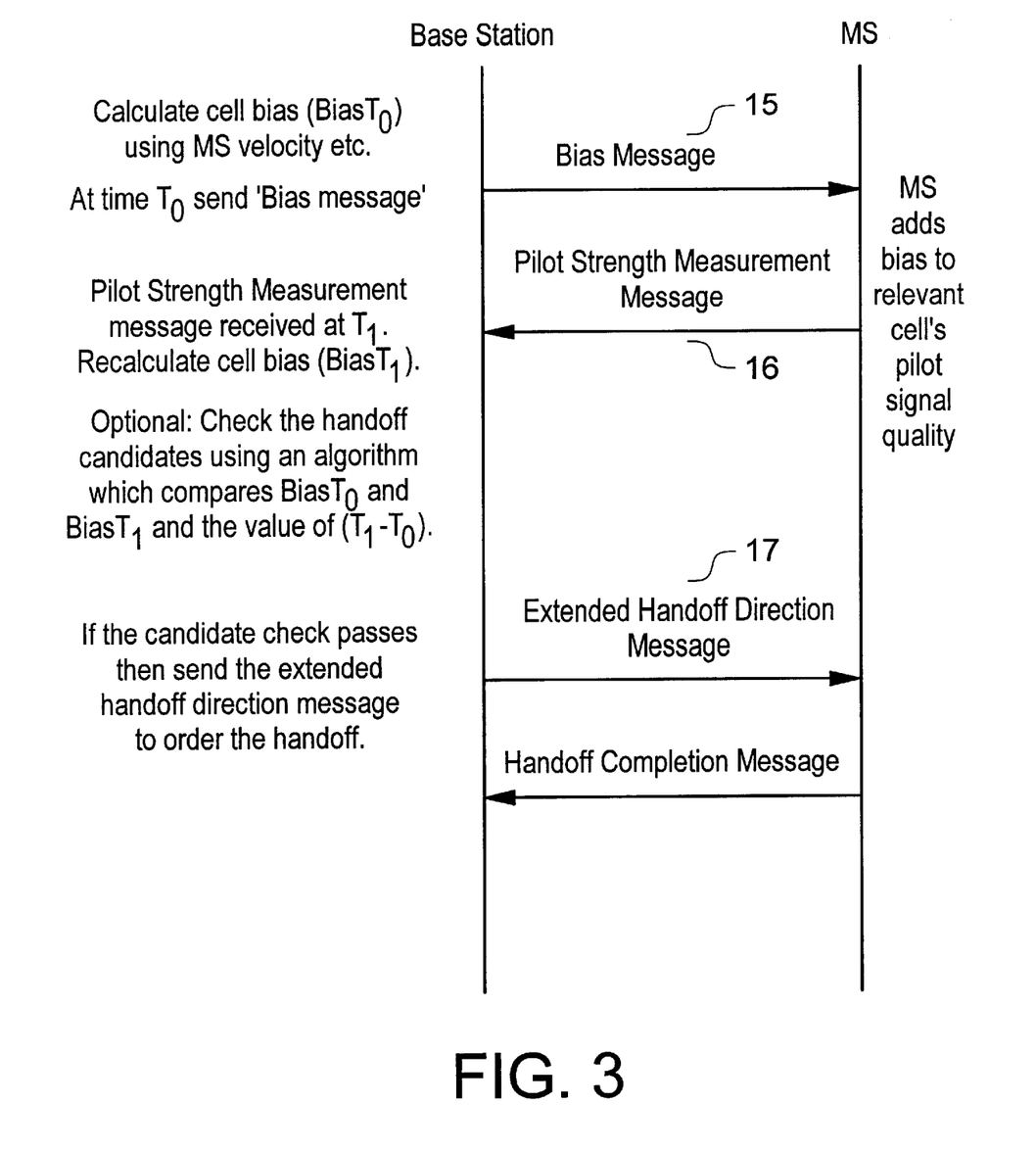
FIG. 3 shows a message diagram corresponding to the exemplary embodiment of FIG. 2.

Returning to FIG. 2, a bias message (see FIG. 3; 15), containing a list of biased cells/sectors along with the associated bias values estimated at 6 above, is then transmitted 8 at time $T_o$ to the mobile station. Alternatively, the bias message can include a list of all proximate cells along with bias values for each proximate cell that has an associated bias value. This bias message may also be transmitted by any system function for the purpose of manipulating hand-off performance. In one exemplary embodiment, the bias message (15, FIG. 3) can be sent periodically, independent of velocity. In other exemplary embodiments, the bias message can be sent as a function of the mobile station velocity. Therefore, if the mobile station velocity is equal to 0, then no bias message would be sent. If, however, the mobile station velocity is not equal to zero then the bias message would be transmitted at a frequency correlating to the mobile station velocity. Thus, bias messages are sent less frequently for low velocity mobile stations as compared to high velocity mobile stations. The system maintains a record of transmitted bias values along with time stamps of when each bias message was transmitted.

Upon receipt of a bias message, the mobile station removes 9 existing bias values that were received with a previously received bias message, and replaces the existing bias values with the current bias values. The mobile station then adds and removes cells 10 from the active and candidate sets using conventional techniques (such as that discussed in the Background section above) except the current bias values are added to the signal quality values that are used as a basis for determining in which set a cell belongs. In other words, if signal strength, signal to interference ratio, or some other signal quality measurements of pilot signals from proximate cells are performed, then the bias values will use the same units and will be added to these measured pilot values. Thus, the system will use the sum of the bias values and the signal quality values for determining which cells will be added or removed from the active and candidate cell lists.

Figure 7:
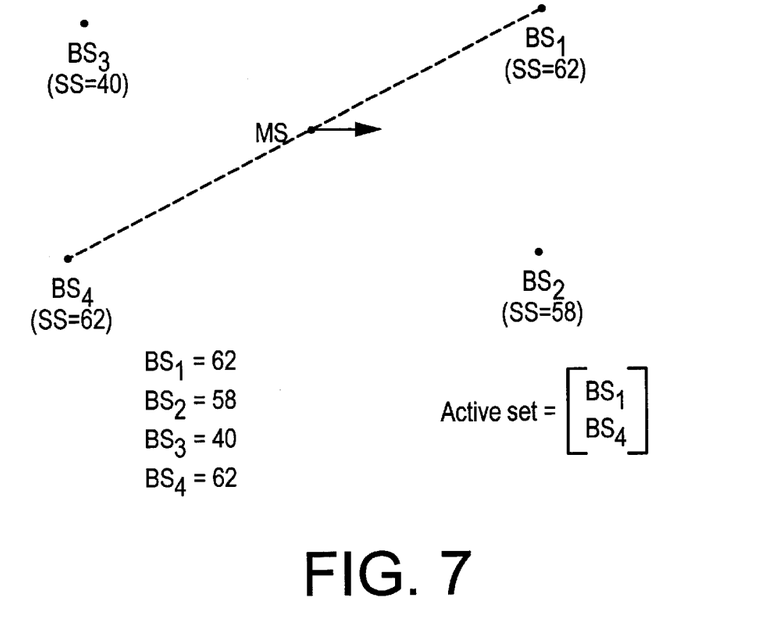
FIG. 7 shows construction of a soft hand-off active set without the biasing information of exemplary embodiments of the invention.

Step 10 of FIG. 2 is further described below to illustrate an example of bias allocation by the system. For purposes of the following illustration, signal strength is assumed to be the signal quality measurement used, with the signal strengths normalized onto a 0–100 scale. Also, for purposes of illustration, the system is assumed to be configured so that mobile station velocity information is translated into bias values in a range of –5 to +5 on the signal strength scale. In a conventional system, where velocity information is not used, an active set is constructed as shown in FIG. 7. In the example shown, $BS_1$, has an associated signal strength of 62, $BS_2$, has an associated signal strength of 58, $BS_3$ has an associated signal strength of 40, and $BS_4$ has an associated signal strength of 62. Assuming that a base station is added to the active set when SS>60, $BS_1$, and $BS_4$ would be placed in the active set of the example shown. Given the direction of the mobile station (towards $BS_1$ and $BS_2$ and away from $BS_3$ and $BS_4$) this causes $BS_4$ to be in soft hand-off with the mobile station for a short period of time.

Figure 8:
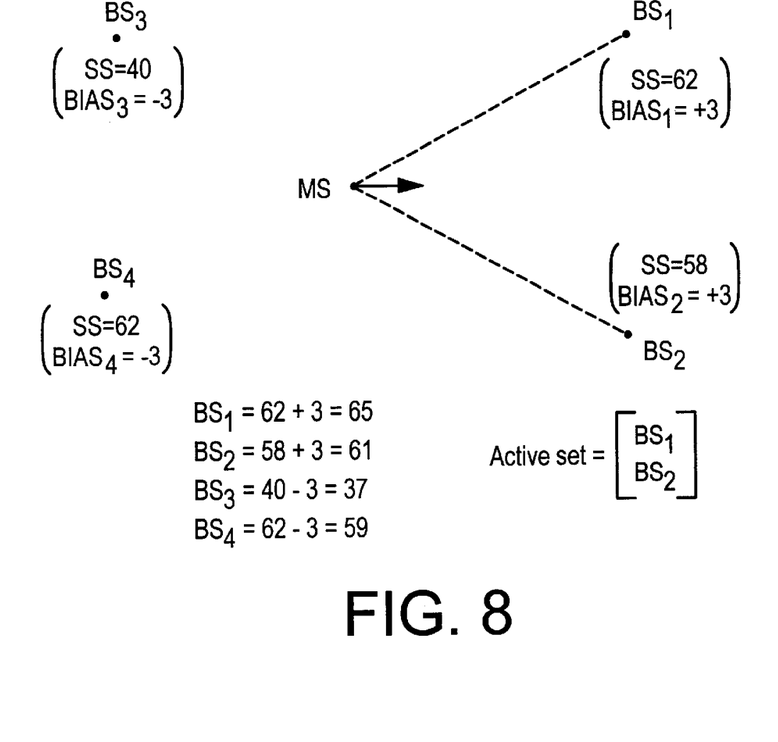
FIG. 8 shows construction of a soft hand-off active set using bias information in accordance with exemplary embodiments of the invention.

However, using bias information in accordance with exemplary embodiments of the invention (as shown in FIG.

8), the base stations that the mobile station is heading towards are placed in the active set. This is accomplished by adding bias values to the measured signal strength values (bias values of $Bias_1=+3$, $Bias_2=+3$, $Bias_3=-3$, and $Bias_4=-3$ are assumed in the example). With this addition, $BS_1$ and $BS_2$ are greater than 60 and $BS_3$ and $BS_4$ and less than 60. $BS_1$, and $BS_2$ are therefore placed in the active set. The bias values have thus "biased" the active set so as to contain base stations that the mobile station is heading towards ($BS_1$, and $BS_2$, not $BS_3$ or $BS_4$) and therefore with which the mobile station will maintain longer soft hand-off connections.

The bias values maintained by the mobile station are not removed, in one exemplary embodiment, until the next bias message is received from the system. Additionally, in another exemplary embodiment, the system may remove all bias values if the system operator disengages operation of the enhancements of the soft hand-off process of the exemplary embodiments of the invention. Also, in another exemplary embodiment, the bias values can be removed after a specified period of time has elapsed in the mobile station, such as for example, by initiation of a timer in the mobile station when a bias message is received.

Returning again to FIG. 2, the mobile station then transmits 11 a message, such as a pilot measurement report message (see FIG. 3; 16), which includes all measured pilot signal values and the bias values ($BIAS_{TO}$) added for the appropriate cells. The system, upon receipt of the message at time $T_1$, from the mobile station, uses the sum of each measured pilot signal value and its corresponding bias value for selecting 12 the strongest cell candidates for placement in the active set. The system then orders 13 the mobile station to hand-off to the strongest cell candidates in the active set via the extended hand-off direction message.

An additional exemplary embodiment further ensures that the bias values ($BIAS_{TO}$) received by the system at time $T_1$, from the mobile station are sufficiently up to date. If too great a time has elapsed between transmission of the bias message to the mobile station and transmission of the pilot strength measurement report to the base station, then the bias values ($BIAS_{TO}$) may have changed a sufficiently large amount. To determine if this is the case, the system in this exemplary embodiment calculates new bias values at the current time and compares these current bias values to bias values $BIAS_{TO}$. If the current bias values are sufficiently different than bias values $BIAS_{TO}$ then new bias values should be calculated and then sent in a bias message to the mobile station. In most cases, however, the pilot strength measurement report should be received soon after the sending of the BIAS message, therefore new bias values will not need to be calculated. The above broadly described algorithm is shown in the following exemplary pseudo-code:

If T1–T0>bias integrity threshold then
    Recalculate T1 bias values for mobile station Compare
        T1 bias values to old (at time T0) bias values If the
        % difference between old and new bias values <difference threshold then use new bias values.
    Select strongest candidates for the active set
    Send Extended Handoff direction message to the mobile station
  else ! the bias values have changed a lot!
    Resend BIAS message to the mobile station with new BIAS values
  endif
else ! T1–T0 <=bias integrity threshold, no recalculation necessary!
  Select strongest candidates for the active set
  Send Extended Handoff direction message to the mobile station
endif The "bias integrity threshold" in the above exemplary pseudo-code represents the time elapsed before the bias values become "stale" and may depend on the velocity of the mobile station.

In the exemplary embodiments described above, the system verifies the location and velocity of the mobile station. However, in an additional exemplary embodiment, these functions can be performed by the mobile station itself. As shown at step 18 in FIG. 4, the mobile station location is determined by the mobile station, or by the system, in a manner previously discussed. The mobile station processor then calculates 19 the mobile station velocity based on a current location and one or more previous mobile station locations and the time ($\Delta t$) elapsed between the location measurements. Using the measured mobile station location and the calculated mobile station velocity the location of the mobile station at some future time is estimated 20. In its simplest form, this estimation can use conventional kinematics well known to one skilled in the art. In a more complex form, the system can take into account known terrain features (e.g., hills, gradients, traffic information from an external news source) to determine the estimated future location.

Figure 4:
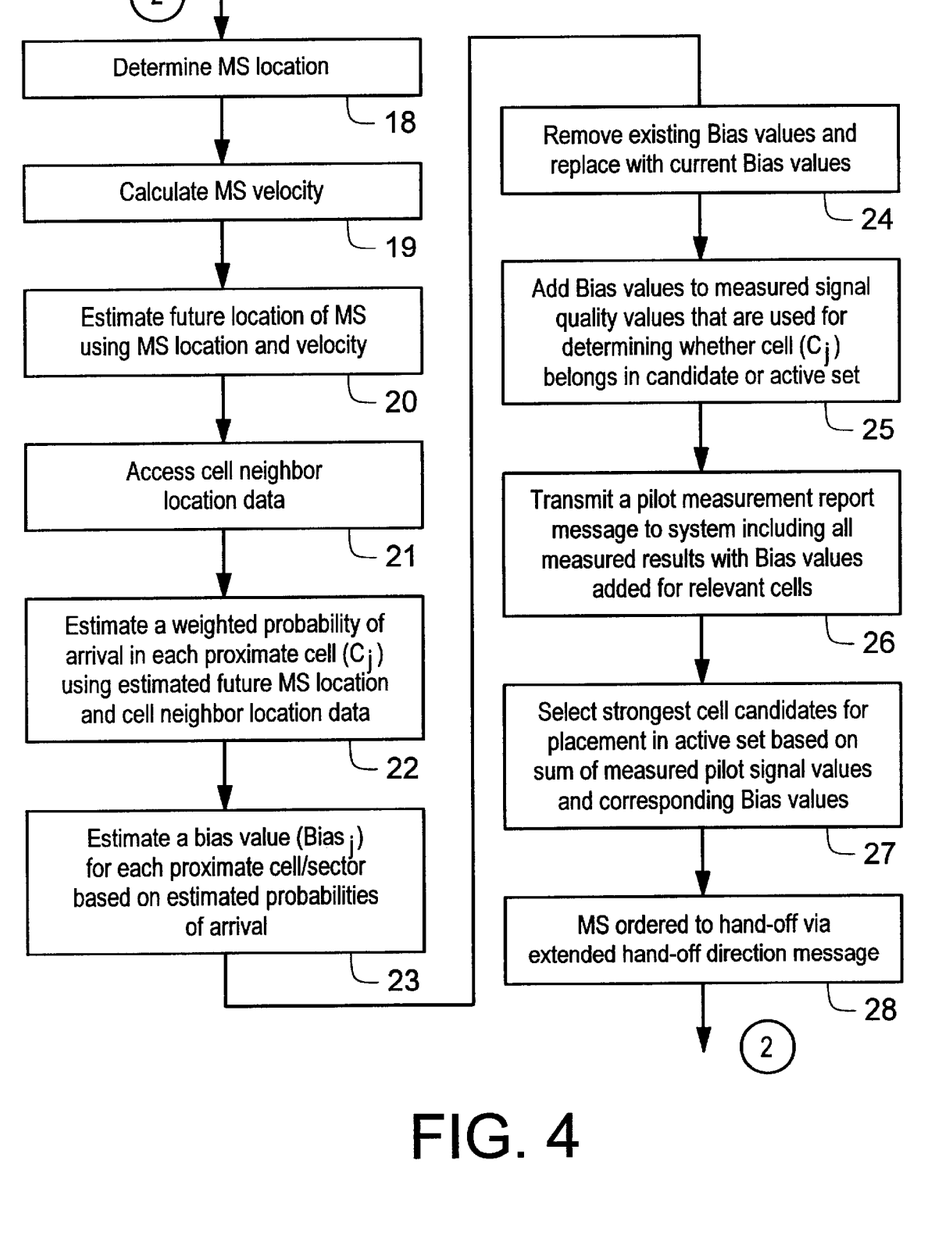
FIG. 4 is a flow diagram of an exemplary embodiment of the invention where the mobile station keeps track of its own location and velocity.

After estimating the future location of the mobile station, the mobile station then accesses 21 stored proximate cell location data previously received from the system. Based on this accessed proximate cell location data and the estimated future location of the mobile station, a weighted probability of arrival in each proximate cell ($C_j$) can be determined 22. A bias value for each proximate cell/sector can then be estimated 23 based on the determined weighted probabilities of arrival. Exemplary applications of the method steps above have previously been described with reference to FIGS. 5 and 6.

The mobile station then removes 24 existing bias values and replaces the existing bias values with the new bias values estimated above. Subsequent to this step, the mobile station adds and removes cells 25 from, for example, the active and candidate sets using conventional techniques (such as that discussed in the Background section above) except the current bias values are added to the signal quality values that are used as a basis for determining in which set a cell belongs. In other words, if signal strength, signal to interference ratio, or other signal quality measurements of pilot signals from proximate cells are performed, then the bias values will use the same units and will be added to these measured pilot values. Thus, the mobile station will use the sum of the bias values and the signal quality values for determining which cells will be added or removed from the active and candidate cell lists. An exemplary description of step 25 has previously been described with reference to step 10 of FIG. 2.

The mobile station then transmits 26 a message, such as a pilot measurement report message, which includes all measured pilot signal values and the bias values added for the appropriate cells. The system, upon receipt of the message from the mobile station, uses the sum of each measured pilot signal value and its corresponding bias value for selecting 27 the strongest cell candidates for placement in the active set. The system then orders 28 the mobile station to hand-off to the strongest cell candidates in the active set via the extended hand-off direction message.

Although a number of embodiments are described herein for purposes of illustration, these embodiments are not meant to be limiting. Those skilled in the art will recognize modifications that can be made in the illustrated embodiment. Such modifications are meant to be covered by the spirit and scope of the appended claims. For example, the exemplary embodiments of the invention could be applied to the WCDMA system. This could be achieved by adding the velocity defined bias described herein to cells in the "handover monitoring" set and the "handover candidate" set of the WCDMA system.

What is claimed is:

1. A method for performing soft hand-off of a mobile station in a radio communications system, comprising the steps of:

determining at least one parameter associated with a velocity of said mobile station;

estimating bias values on a chosen set of cells/sectors based on said at least one parameter;

determining signal quality values associated with each of said cells/sectors;

modifying said signal quality values with said bias values;

constructing a list of potential cells/sectors for communication based on said modified signal quality values; and dedicating communication channels between said mobile station and cell/sectors contained in said list.

2. A method for constructing a list of potential cells/sectors for soft hand-off of a mobile station in a radio communications system, comprising the steps of:

determining signal quality values associated with cells/sectors located in proximity to said mobile station;

modifying said signal quality values with bias values that are based on at least one parameter associated with said mobile station; and constructing said list based on said modified signal quality values.

3. The method of claim 2, wherein said at least one parameter includes mobile station velocity.

4. The method of claim 2, wherein said at least one parameter includes an estimated future location of said mobile station.

5. The method of claim 2, wherein said at least one parameter includes estimated probabilities of said mobile station arriving in said cells/sectors.

6. The method of claim 2, wherein said at least one parameter includes probabilities of the mobile station traveling given geographic routes.

7. The method of claim 6, wherein said probabilities are derived from historical mobile station traveling data.

8. The method of claim 3, wherein said velocity is determined by said mobile station.

9. The method of claim 3, wherein said velocity is determined by said radio communications system.

10. The method of claim 2, wherein said list contains those cells/sectors that have associated modified signal quality values which satisfy a first criteria.

11. The method of claim 2, wherein said list is an active cell/sector list.

12. The method of claim 2, wherein said list is a candidate cell/sector list.

13. The method of claim 2, wherein the frequency of determining said parameter is dependent on the velocity of said mobile station.

14. A system for performing soft hand-off of a mobile station in a radio communications system, comprising:

means for determining at least one parameter associated with a velocity of said mobile station;

means for estimating bias values on a chosen set of cells/sectors based on said at least one parameter;

means for determining signal quality values associated with each of said cells/sectors;

means for modifying said signal quality values with said bias values;

means for constructing a list of potential cells/sectors for communication based on said modified signal quality values; and means for dedicating communication channels between said mobile station and cell/sectors contained in said list.

15. A system for constructing a list of potential cells/sectors for soft hand-off of a mobile station in a radio communications system, comprising:

means for determining signal quality values associated with cells/sectors located in proximity to said mobile station;

means for modifying said signal quality values with bias values that are based on at least one parameter associated with said mobile station; and means for constructing said list based on said modified signal quality values.

16. The system of claim 15, wherein said at least one parameter includes mobile station velocity.

17. The system of claim 15, wherein said at least one parameter includes an estimated future location of said mobile station.

18. The system of claim 15, wherein said at least one parameter includes estimated probabilities of said mobile station arriving in said cells/sectors.

19. The system of claim 15, wherein said at least one parameter includes probabilities of the mobile station traveling given geographic routes.

20. The system of claim 19, wherein said probabilities are derived from historical mobile station traveling data.

21. The system of claim 16, wherein said velocity is determined by said mobile station.

22. The system of claim 16, wherein said velocity is determined by said radio communications system.

23. The system of claim 15, wherein said list contains those cells/sectors that have associated modified signal quality values which satisfy a first criteria.

24. The system of claim 15, wherein said list is an active cell/sector list.

25. The system of claim 15, wherein said list is a candidate cell/sector list.

26. The system of claim 15, wherein the frequency of determining said parameter is dependent on the velocity of said mobile station.

* * * * *